(12) United States Patent
Kunz (10) Patent No.: US 9,157,658 B2
(45) Date of Patent: Oct. 13, 2015

(54) PARABOLIC TROUGH COLLECTOR

(75) Inventor: Günther Kunz, Montzen (BE)

(73) Assignee: MERSCH, SABINE, Eupen (BE)

( * ) Notice: Subject to any disclaimer, the term of this patent is extended or adjusted under 35 U.S.C. 154(b) by 1357 days.

(21) Appl. No.: 12/450,593

(22) PCT Filed: Mar. 7, 2008

(86) PCT No.: PCT/EP2008/001829
§ 371 (c)(1),
(2), (4) Date: Sep. 30, 2009

(87) PCT Pub. No.: WO2008/119435
PCT Pub. Date: Oct. 9, 2008

(65) Prior Publication Data
US 2010/0051021 A1     Mar. 4, 2010

(30) Foreign Application Priority Data

| Mar. 30, 2007 | (DE) | .......................... 10 2007 015 850 |
| Jun. 5, 2007 | (DE) | .......................... 10 2007 026 473 |

(51) Int. Cl.
| F24J 2/10 | (2006.01) |
| F24J 2/12 | (2006.01) |
| F24J 2/24 | (2006.01) |
| F24J 2/14 | (2006.01) |
| F24J 2/52 | (2006.01) |
| F24J 2/54 | (2006.01) |
| F24J 2/38 | (2014.01) |

(52) U.S. Cl.
CPC *F24J 2/14* (2013.01); *F24J 2/5241* (2013.01); *F24J 2/541* (2013.01); F24J 2002/5286 (2013.01); *Y02E 10/45* (2013.01); *Y02E 10/47* (2013.01)

(58) Field of Classification Search
USPC .......................... 126/694, 600, 605, 606, 651
See application file for complete search history.

(56) References Cited

U.S. PATENT DOCUMENTS

| 528,255 | A | | 10/1894 | Monks et al. |
| 2,182,222 | A | | 12/1939 | Courtis et al. |
| 2,387,355 | A | * | 10/1945 | Rehfeld .......................... 405/29 |
| 2,906,257 | A | | 9/1959 | Abbot |
| 3,496,687 | A | * | 2/1970 | Greenberg et al. .............. 52/109 |
| 3,959,056 | A | | 5/1976 | Caplan |
| 4,038,972 | A | * | 8/1977 | Orrison ......................... 126/578 |
| 4,078,549 | A | | 3/1978 | McKeen et al. |

(Continued)

FOREIGN PATENT DOCUMENTS

| DE | 28 01 560 | 7/1978 |
| EP | 1 397 621 | 3/2004 |

(Continued)

*Primary Examiner* — Steven B. McAllister
*Assistant Examiner* — Desmond C Peyton
(74) *Attorney, Agent, or Firm* — Lucas & Mercanti, LLP (57) ABSTRACT

A parabolic trough collector having a supporting construction which is connected in an articulated manner to a substructure carrying the parabolic trough collector. In order to provide a parabolic trough collector which is simply designed, easy to assemble and which, therefore, can also be transported in sections while at the same time ensuring a highly accurate parabola with high rigidity and greater maximum overall length, a complicated supporting construction at the underside of the parabolic trough collector is eliminated, and the static and dynamic forces that occur at the parabolic trough collector are conducted away in an optimal manner.

15 Claims, 6 Drawing Sheets

(56) References Cited

U.S. PATENT DOCUMENTS

| | | | |
|---|---|---|---|
| 4,135,493 A * | 1/1979 | Kennedy | 126/577 |
| 4,249,514 A * | 2/1981 | Jones | 126/605 |
| 4,423,719 A | 1/1984 | Hutchison | |
| 4,875,467 A * | 10/1989 | Murphy | 126/600 |
| 5,058,565 A * | 10/1991 | Gee et al. | 126/570 |
| 5,069,540 A * | 12/1991 | Gonder | 359/853 |
| 5,169,456 A | 12/1992 | Johnson | |
| 5,660,644 A * | 8/1997 | Clemens | 136/245 |
| 6,543,441 B2 * | 4/2003 | Funger et al. | 126/606 |
| 7,878,191 B2 * | 2/2011 | Bender | 126/696 |
| 7,926,480 B2 * | 4/2011 | Le Lievre | 126/684 |
| 7,950,386 B2 * | 5/2011 | Lievre | 126/600 |
| 8,408,198 B2 * | 4/2013 | Bender | 126/600 |
| 8,578,929 B2 * | 11/2013 | Krabbe et al. | 126/605 |
| 8,669,462 B2 * | 3/2014 | Almogy et al. | 136/246 |
| 8,671,931 B2 * | 3/2014 | Curtis et al. | 126/704 |
| 8,686,279 B2 * | 4/2014 | Almogy et al. | 136/246 |
| 2006/0124123 A1 | 6/2006 | Whelan | |
| 2006/0150967 A1 * | 7/2006 | Hoelle et al. | 126/694 |
| 2006/0157050 A1 * | 7/2006 | Le Lievre | 126/696 |
| 2008/0308094 A1 * | 12/2008 | Johnston | 126/694 |
| 2010/0018520 A1 * | 1/2010 | Prueitt | 126/694 |

FOREIGN PATENT DOCUMENTS

| | | | |
|---|---|---|---|
| GB | 2 235 786 | 3/1991 | |
| JP | 60006912 A * | 1/1985 | G02B 7/00 |
| WO | WO 02/103256 | 12/2002 | |
| WO | WO 2005/120172 | 12/2005 | |

* cited by examiner

Details A

PARABOLIC TROUGH COLLECTOR

CROSS-REFERENCE TO RELATED APPLICATIONS

This is a U.S. national stage of International Application No. PCT/EP2008/001829, filed on 7 Mar. 2008. Priority is claimed on German Application Nos. 10 2007 015 850.7, filed on 30 Mar. 2007 and 10 2007 026 473.0, filed on 5 Jun. 2007. The contents of each of these applications is expressly incorporated herein by reference.

BACKGROUND OF THE INVENTION

1. Field of the Invention

The invention is directed to a parabolic trough collector with a reflecting surface which concentrates sunlight on an absorber extending in the focal line, the reflecting surface being arranged on at least one panel having a parabolic cross section and a dimension extending in a straight line in longitudinal direction of the parabolic trough collector, and a supporting construction which is connected in an articulated manner to a substructure carrying the parabolic trough collector is arranged at the convex underside of every panel.

2. Description of the Related Art

Parabolic trough collectors substantially comprise parabolically curved reflecting surfaces which concentrate sunlight on an absorber extending in the focal line. The focal line and the vertex of the parabola define the plane of symmetry of the parabolic reflective surface. Depending on the type of construction, collectors of this kind usually have a length between several meters and 150 meters. Shorter parabolic trough collectors can be combined as individual modules to form a collector field. The concentrated solar radiation is converted into heat in the absorbers and is supplied to a circulating fluid, particularly water or some other liquid or gaseous medium.

For reasons pertaining to cost, the parabolic troughs are usually constructed so as to be swivelable around only one axis and, to this extent, follow the direction of the sun's incident radiation.

European Patent EP 1 397 621 B1 discloses a parabolic trough collector of the kind mentioned above which has a plurality of self-supporting panels having a parabolic cross section and a dimension extending in a straight line in the longitudinal direction. The panels serve to support the thin reflecting surface connected to them. The panel is arranged with its convex side at a tubular supporting member which extends in longitudinal direction and which is provided with an automated device for rotating around the axis of the supporting member so that the reflecting surfaces on the panels can follow the movement of the sun. The panels can either be fastened directly to the annular supporting member or can be supported at the transversely extending support ribs arranged at the tubular supporting member.

In either case, the parabolic trough collectors according to the prior art require a stable supporting structure to impart sufficient rigidity to the panels. The requirements for dimensional accuracy and static rigidity of the supporting structures of parabolic trough collectors which support the reflecting surfaces are extremely high, particularly because bending forces and torsional forces caused by deadweight and wind loads must be absorbed without exceeding a definable maximum deformation of the parabola leading to loss of output.

Owing to the demanding requirements with respect to the accuracy of the parabolic shape, parabolic trough collectors must be produced in manufacturing plants that are specially outfitted for this purpose. Because of this, high costs arise from transportation logistics leading up to installation at the setup site because the structural components are very fragile on the one hand and very bulky on the other hand.

To reduce the cost of production and facilitate use by untrained personnel, U.S. Pat. No. 2,906,257 A discloses a parabolic trough collector with a reflecting layer which concentrates sunlight on an absorber extending along the focal line. The absorber in the parabolic trough collector extends from lateral trunnions which are arranged at end pieces of the parabolic trough collector. A supporting construction which is formed by bracing members extending downward and converging at a central point below the collector and by metal tubes and which is defined laterally by end pieces is arranged at the convex underside of the reflecting layer. The end pieces form a holder for a stanchion which extends upward. The stanchion is formed of side cheeks which are fastened to the end pieces and are interconnected by a pipe arranged above the focal line. Four wires running diagonally to the corners of the parabolic trough collector are arranged at a central point of this pipe. Each wire cable has a turnbuckle for pretensioning the wires.

The structure of the parabolic trough collector according to U.S. Pat. No. 2,906,257 A, which is formed of a complicated understructure at the underside and by wire cable bracing at the upper side, has a sufficient static stability. The high forces exerted on the pipe of the stanchion by the wire bracing necessitate a relatively heavy-duty dimensioning of this pipe. That being the case, the required pipe diameter would cause unwanted shadows on the reflecting surface. A further disadvantage consists in that the bending stresses occurring in the parabolic trough collector increase as the length increases so that its maximum length is limited in the interests of an acceptable maximum deformation of the parabola.

SUMMARY OF THE INVENTION

It is therefore an object of the invention to provide a parabolic trough collector which is designed more simply, is easy to assemble and, therefore, can also be transported in sections while at the same time ensuring a highly accurate parabola with high rigidity and greater maximum overall length.

This and other objects and advantages are achieved by dispensing with a complicated supporting construction at the underside of the reflecting surface of the parabolic trough collector, while at the same time ensuring that the static and dynamic forces occurring at the parabolic trough collector are conducted away in an optimal manner.

In particular, the above-stated objects and advantages are achieved by a parabolic trough collector of the type mentioned above in which the supporting construction is formed by at least three supporting ribs which are arranged at the convex underside of the parabolic trough collector and extend transverse to the longitudinal direction thereof, wherein a stanchion which extends upwardly is arranged at every second supporting rib starting from the end supporting ribs, a rotary bearing is arranged at every supporting rib for arranging the parabolic trough collector such that it is rotatable around a pivot extending parallel to its longitudinal axis, at least four elongated force transmission devices are arranged at the stanchion, and the force transmission devices extend between the stanchion and the supporting construction, wherein the force transmission devices form the lateral edges of a right pyramid whose apex, which lies in the plane of symmetry of the parabolic reflecting surface, is formed by the force transmission devices converging at the stanchion.

The required torsional rigidity of the parabolic trough collector is achieved by the cooperation between the supporting construction and the force transmission devices arranged in a pyramid configuration above the parabolic trough. Preferably, every two panels, particularly in the form of structural plates, together with the associated dimensionally stable ribs, form the base of a right pyramid which is formed by the stanchion supported on the center rib and by a bracing formed by the force transmission devices, preferably wire cables, between a stop for the wire cables at the stanchion to the corners of the pyramid, preferably the outer end areas of the outer ribs. In this way, optimal lever ratios are ensured when force is introduced. But the fastening points can also be located at other positions on the supporting construction provided that the force transmission devices are connected to the supporting construction at the same distance on both sides of the plane of symmetry of the parabolic reflecting surface. However, forces acting on the parabolic trough collector can be conducted away better when the distance from the plane of symmetry is greater.

The supporting construction must be capable of transmitting shear stresses occurring in the panels. This can be accomplished through sufficiently stiff panels in connection with supporting ribs extending transverse to the longitudinal direction of the parabolic trough collector. If less rigid panels are used, e.g., structural plates, the supporting construction has longitudinal reinforcements in longitudinal direction, particularly at the edges of the ribs. In addition, profiles, particularly V-section members, can be arranged if need be in longitudinal direction at the underside of the panels. The longitudinal reinforcements at the edges of the structural plates are preferably fixedly connected to their underside so that the structural plate is also fixedly clamped in the edge areas on both sides in order to prevent local deformations of the structural plate, for example, owing to acting wind loads. In addition, the structural plate can be bent around the longitudinal reinforcement for stabilizing in the vicinity of the edges. The ribs are supporting structural component parts of the supporting construction and, at the same time, supports for the panels. This mode of construction substantially reduces weight compared to a solid supporting construction.

The arrangement according to the invention is torsionally rigid to a great degree while reducing the cost and weight of the construction at the same time. The shadows cast on the reflecting surfaces by the thin rods or wire cables of the bracing are very minor. Further, the stanchion, which is rod-shaped in particular, can likewise be outfitted with a holder for the absorber and can accordingly perform a dual function.

By linking together a series of identical pyramids, a high torsional rigidity can be produced in a parabolic trough collector over virtually any length. The forces absorbed by the bracing are diverted to the dimensionally stable substructure by the rotary bearing arranged at every supporting rib, and shift the burden of expenditure on stabilization from the dimensionally accurate parabolic trough to the less exacting substructure.

The dimensionally stable ribs are arranged at regular intervals whose maximum spacing is limited by the available manufactured widths of the reflective foils (currently a maximum of 1.25 m) and are connected to one another by the panels, preferably in the form of structural plates. The fastening of the structural plates to the ribs is carried out in that connection members, e.g., welded angle pieces, arranged at the structural plate are screwed to the ribs. The screw openings are arranged at the ribs in such a way that the desired parabolic shape of the structural plates is produced by screwing them together.

The parabolic trough collector brings about a separation of the two following functions:

The dimensional accuracy of the reflecting surface is provided solely through the supporting construction, particularly in the form of the ribs and possibly longitudinal reinforcements and the panels, particularly in the form of structural plates. Static bending forces need not be taken into account.

The dimensionally stable substructure absorbs the static forces via the bearings arranged at every supporting rib.

The deviations of the parabolic trough from the spatially ideal parabola cross section at certain points are minimal so that the intercept factor $\gamma$ is at a maximum. The focal width (due to the expansion of the reflected cone of the sun's rays) is smaller in comparison to known parabolic troughs, and the absorber tube diameter can exceed the focal width so that the intercept factor is $\gamma=100\%$.

In an advantageous embodiment of the invention, tolerances of the substructure can be compensated by rotary bearings for the supporting construction which are adjustable at the substructure. Therefore, the substructure can be fabricated by any work force present at the installation site with limited technical know-how and need not be produced in a special manufacturing plant and then transported.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be described more fully in the following with reference to an embodiment example, The drawings show:

FIGS. 6 and 6a are perspective views of a rotary bearing of the parabolic trough collector according to FIGS. 1 and 2 and a detail thereof.

DETAILED DESCRIPTION OF THE PREFERRED EMBODIMENTS

Figure 1:
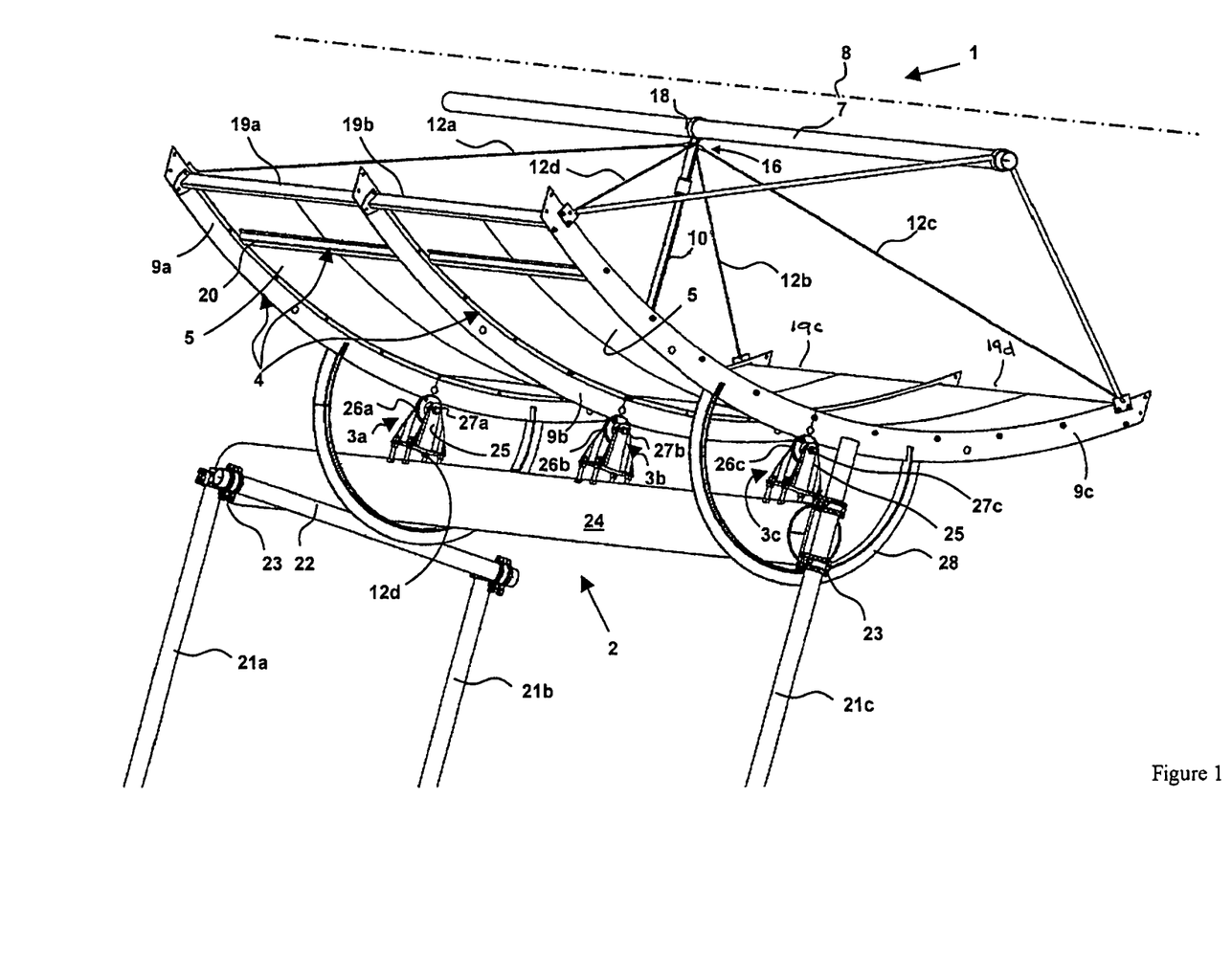
FIG. 1 is a bottom perspective view of a parabolic trough collector according to the invention.
Figure 2:
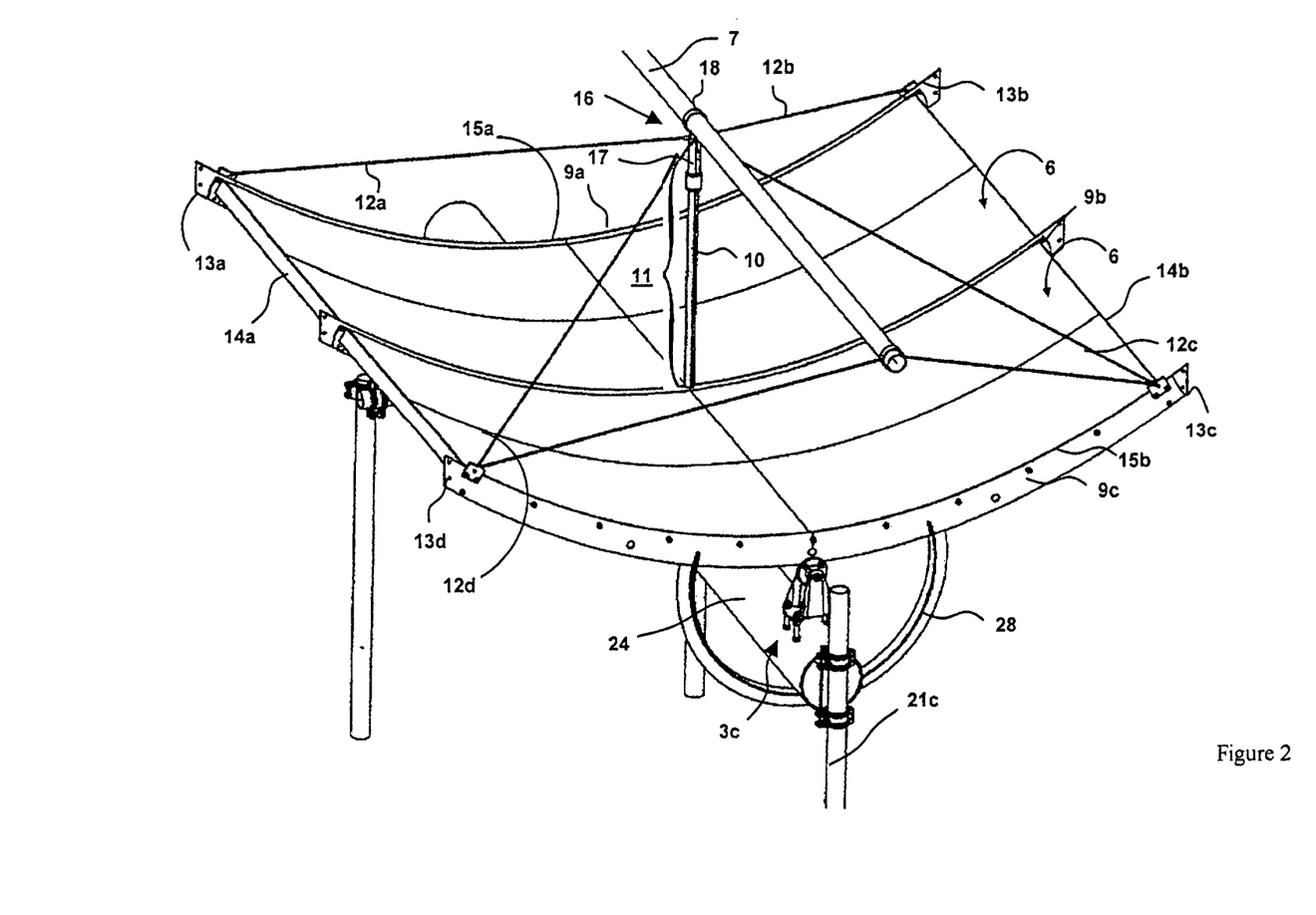
FIG. 2 is a top perspective view of the parabolic trough collector according to FIG. 1.

Referring to FIGS. 1 and 2, a parabolic trough collector (1) according to an embodiment of the present invention substantially comprises a substructure (2) which is connected by rotary bearings (3) to a supporting construction (4) for two panels. A reflective foil (6) which concentrates sunlight impinging on its surface on an absorber (7) extending in the focal line is arranged on the surface of the panels (5) which can be seen in FIG. 2. The panels (5) having a parabolic cross section extend in a straight line in longitudinal direction (8) of the parabolic trough collector (1).

The supporting construction, designated in its entirety by (4), of the parabolic trough collector (1) is formed by three supporting ribs (9a, 9b, 9c) which are arranged at the convex underside of the parabolic trough collector and extend transverse to the longitudinal direction (8) thereof and by longitudinal reinforcements (19a-19d), as shown in FIG. 3c. The supporting rib (9b) arranged between the two end supporting ribs (9a, 9c) supports a holder (shown schematically in FIG. 7) for a rod-shaped stanchion (10). The holder can be constructed such that, for example, a pin arranged at the upwardly directed narrow side of the center supporting rib (9b) engages by positive engagement in a corresponding recess arranged at the lower end of the stanchion (10). The stanchion (10) itself lies in the plane of symmetry of the surface area defined parabolically by the panels (5). The axis of the parabola extends in the plane of symmetry along the entire length of the parabolic trough collector. The axis of the parabola refers to the straight line connecting the focal point of the parabola with its vertex. The ribs (9a-c) are formed parabolically transverse to the longitudinal axis (8) of the parabolic trough collector and are preferably profiled in cross section such that they oppose forces acting in the direction of the longitudinal axis (8) with a high section modulus. Examples of profile cross sections that may be considered are square sections, T-sections, or I-sections.

Four wire cables (12a, b, c, d) are fastened at a uniform height at a distance (11) from the fastening of the stanchion (10) to the supporting rib (9b) and are connected by their opposite ends to the outer end areas (13a, 13b, 13c, 13d) of the supporting ribs (9a, 9c) adjacent to the center supporting rib (9b). The four wire cables (12a, b, c, d) form the lateral edges of a right pyramid whose apex is formed by the wire cables converging at the stanchion (10). The wire cables all have the same length. The edges of the base of the pyramid defined by the wire cables (12a-d) extend parallel to the edges (14a, b) on the longitudinal sides and the edges (15a, 15b) on the end sides of the parabolic trough.

Below the stop (16) for the wire cables (12a-d), the stanchion (10) has a spring assembly (17) which acts in the axial direction of the stanchion (10) and which pretensions the wire cables (12a-d). The spring assembly (17) is constructed as a telescope suspension and is additionally outfitted with a spring damper (not shown) which prevents the build up of vibrations in the parabolic trough collector.

A hollow-cylindrical holder (18) is arranged at the tip of the stanchion (10) for receiving the tubular absorber (7) which is located in the focal line of the parabolic trough defined by the panels (5).

As was already mentioned, the supporting construction (4) is stabilized in longitudinal direction (8) by longitudinal reinforcements (19a-d) which are screwed to the edges of the panels (5) between the supporting ribs (9a, b, c). In addition, V-sections (20) can be arranged at the underside.

The substructure (2) has a total of three legs (21a-c). Legs (21a, b) are connected to one another by a crossbar (22). The use of three legs allows a secure setup on uneven terrain. Leg (21c), but also legs (21a, b), are guided in clamps (23) and can therefore be adjusted in height without difficulty for horizontal alignment of the parabolic trough collector (1). A cylindrical supporting member (24) extends between leg (21c) and the crossbar (22) supported by legs (21a, b), the rotary bearing (3) allocated to each supporting rib (9a-c) being arranged at the underside of the cylindrical supporting member (24). Every rotary bearing (3) comprises two cheeks (25) which are arranged parallel to one another. A pivot (27a-c), around which the parabolic trough collector can swivel, is supported between the cheeks (25). All of the pivots (27a-c) are aligned with one another and extend through passages in the semicircular projections (26a-c) at the supporting ribs (9a-c), which passages are aligned with respect to one another.

The tracking of the parabolic trough collector is performed by swiveling the parabolic trough collector (1) around the axis of rotation (27a-c) defined by the rotary bearing (3), the swiveling movement being achieved by a rotary drive which engages at the supporting construction (4), but which is not shown in FIGS. 1 and 2 for clarity. The output of the rotary drive preferably engages at the two end supporting ribs (9a, 9c), for example, at the profiles (28) extending downward in a semicircular shape, to reduce torsional forces in the parabolic trough collector.

All of the wind forces acting on the parabolic trough collector perpendicular to the longitudinal axis (8) are diverted directly to the substructure (2) and the foundation via the rotary bearing (3). These forces do not cause bending stresses in the rotatable parabolic trough collector (1).

Since static wind forces also generate torsional forces in the parabolic trough collector and, therefore, in the reflector, the parabolic trough collector (1) must also be stiffened against torsion. The torsional rigidity is achieved by the pyramid-shaped bracing on the upper side of the parabolic trough collector.

As seen from FIG. 3a), a compressive force D is built up in the direction of the perpendicular rod-shaped stanchion (10) by a preloaded spring assembly in the form of a compression spring, this compressive force D in turn generating a constant cable tension S in the direction of the wire cables through vector decomposition in the wire cables (12a-d).

Figure 3:
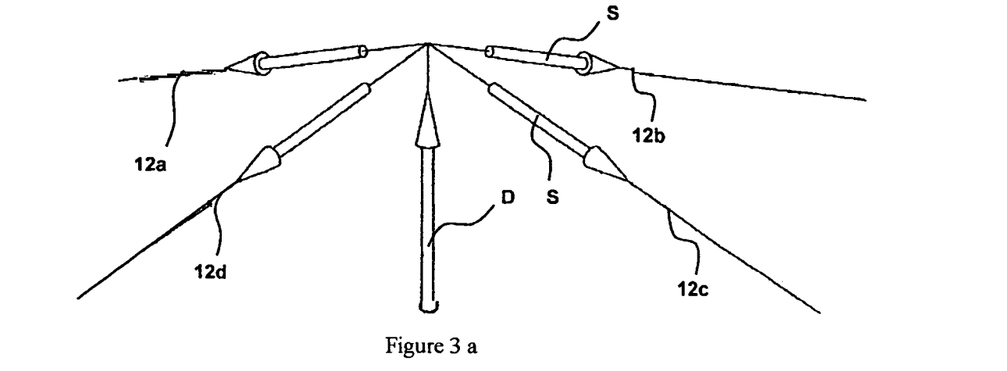
FIGS. 3a-c are schematic diagrams showing the static force ratios at a parabolic trough collector according to FIGS. 1 and 2.

It can be seen from FIG. 3 b) in combination with FIG. 3c) that this tensile force generated by the cable tension S also acts as a vector on the end areas (13a-d) of the supporting ribs (9a-c). By decomposing this vector into components, it can be seen that a shearing force Q loads the longitudinal reinforcements (19a-d) as a compressive force. The horizontal component H and the vertical component V of the force both act on the end areas (13a-d) of the supporting ribs (9a-c) and, by way of the lever effect in the supporting rib (9a-9c), generate a bending moment which must be absorbed through its structure.

Figure 4:
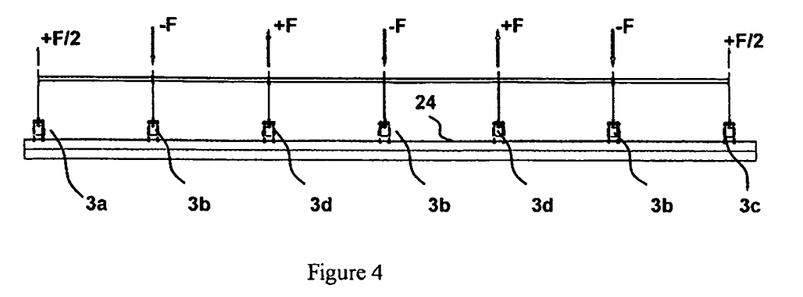
FIG. 4 is a schematic diagram showing the reaction forces on the rotary bearings at a parabolic trough collector with seven supporting ribs.

In a longitudinal section through a parabolic trough collector having seven supporting ribs, FIG. 4 shows the result of the reaction forces F on the respective bearings (3a-d). It can be seen that the operative direction of the reaction forces F alternates, and the sum of all of the reaction forces equals zero. The reaction force generated by every support in the associated bearings (3b) is four-times greater than the vertical component V of the individual cable tensions S. The reaction forces F/2 at the end bearings (3a, 3c) are only half the magnitude of those in the rest of the bearings (3b, 3d) between the end bearings (3a, 3c).

The static force ratios shown in FIGS. (3a)-(c) and (4) do not take into account any externally acting force, for example, due to wind loads. Under external forces, the static system reacts such that all of the reaction forces F to 0 are compensated, but displacements occur between the height of the reaction forces F occurring at the bearings (3a-d), and the magnitude of these displacements must be limited so as to limit the deformation of the parabolic surface of the reflector under all tolerated external forces so that no energy losses should be expected from defocusing.

The most important external forces are wind loads acting on the parabolic trough collector which acts as an airfoil and reacts to oncoming air flows with static and dynamic forces. These dynamic forces can result in damage to the parabolic trough collector due to resonance vibrations.

Figure 5:
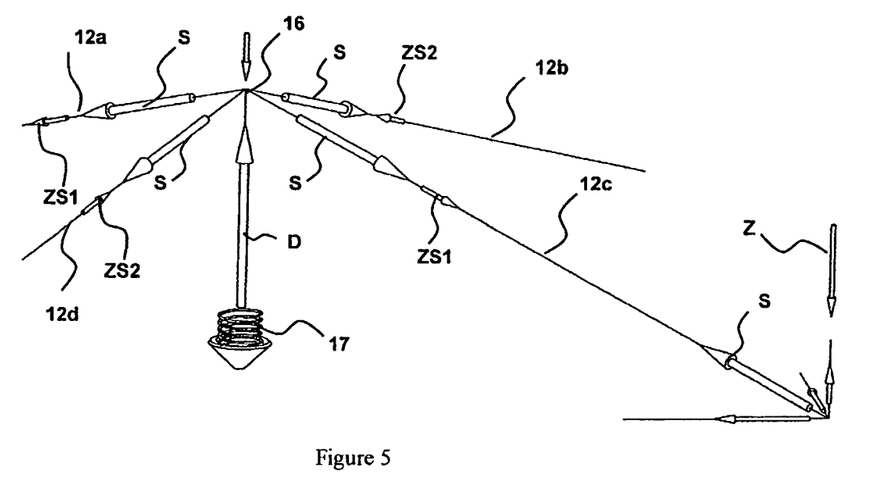
FIG. 5 is a schematic diagram showing the static force ratios at a parabolic trough collector, taking into account an asymmetrically acting additional force caused by wind loads.

FIG. 5 shows schematically how an asymmetrically acting additional force Z caused, e.g., by wind and simulated by a vertical force in an end area (13c) influences the internal distribution of forces in the parabolic trough collector. Due to the additional force Z, the original cable tension S in wire cables (12a, 12c) is increased by an amount ZS 1 given by the vector decomposition of the acting force in the direction of extension of the cable, while the cable force S in wire cables (12b, 12d) decreases by an amount ZS 2 along the intersecting lateral edge of the pyramid.

The spring assembly (17) is compressed due to the changed compressive force D. The stop (16) of the wire cables (12a-d) is accordingly shifted downward slightly. A rotation around the longitudinal axis occurs in the parabolic trough collector. The resistance to this rotation is called torsional resistance. It is the deciding factor for the absorption of wind loads. The torsional resistance is significantly determined by the transverse rigidity of the supporting ribs (9a-c) relative to the longitudinal axis of the parabolic trough collector, the longitudinal extension of the wire cables (12a-d), and the spring constant of the spring suspension (17). In terms of construction, the stiffness of the supporting ribs (9a-c) and the longitudinal extension of the wire cables are preferably determined such that almost the entire additional force Z is absorbed by the displacement of the stop (16) against the force of the spring assembly (17). The displacement path must be limited such that all of the sun's rays impinging on the reflective foil (6) still impinge on the absorber (7).

A curved surface such as that presented by the mirror surface of the parabolic trough collector (1) reacts to oncoming air flow like an airfoil. This means that at given flow ratios due to the prevailing wind the mirror surface, in tracking the sun, can occupy swiveling positions which can lead to its being destroyed by resonant vibrations.

When wind flows against a horizontally oriented parabolic trough collector, the wind generates resistance forces and downforces which initially act only statically on the collector as bending loads and torsional loads. When the mirror continues to rotate in the wind, downforce and resistance continue to increase until the downforce reaches a maximum and thereafter drops off rapidly due to vortex shedding. A so-called Kármán vortex street is formed behind the separation edge. The vortices generate forces acting periodically on the collector. The exciting frequency of these forces is about two to three hertz in current mirror geometries.

The reflector in accordance with the invention is configured such that its lower natural frequency is at least twice as high as the exciting frequency of about two to three hertz. In terms of construction, this is achieved through the increased rigidity and a simultaneous reduction in the mass of the parabolic trough collector according to the invention, particularly owing to the lightweight supporting construction supported at every supporting rib. Investigation has shown that the collector in accordance with the invention can also withstand dynamic force excitations without difficulty depending on the type of construction.

Referring to FIG. 4, the supplied rotary bearings (3a-d) are mounted on the substructure (2), which can be set up with relatively loose manufacturing tolerances by low-skilled personnel, such that only the pivots (27a-c) arranged between the cheeks of the rotary bearings (3a-d) need be oriented in alignment to one another owing to the adjustment options of the rotary bearings (3a-d). By contrast, a precise adjustment of the distance between the bearings is unnecessary because preferably only one rotary bearing (3a) is arranged as a fixed bearing which is not displaceable in the longitudinal direction (8), and all of the other bearings (3b, c, d) are arranged as floating bearings such that they are displaceable in the longitudinal direction, particularly also to compensate for temperature-dependent expansion changes.

Figure 6:
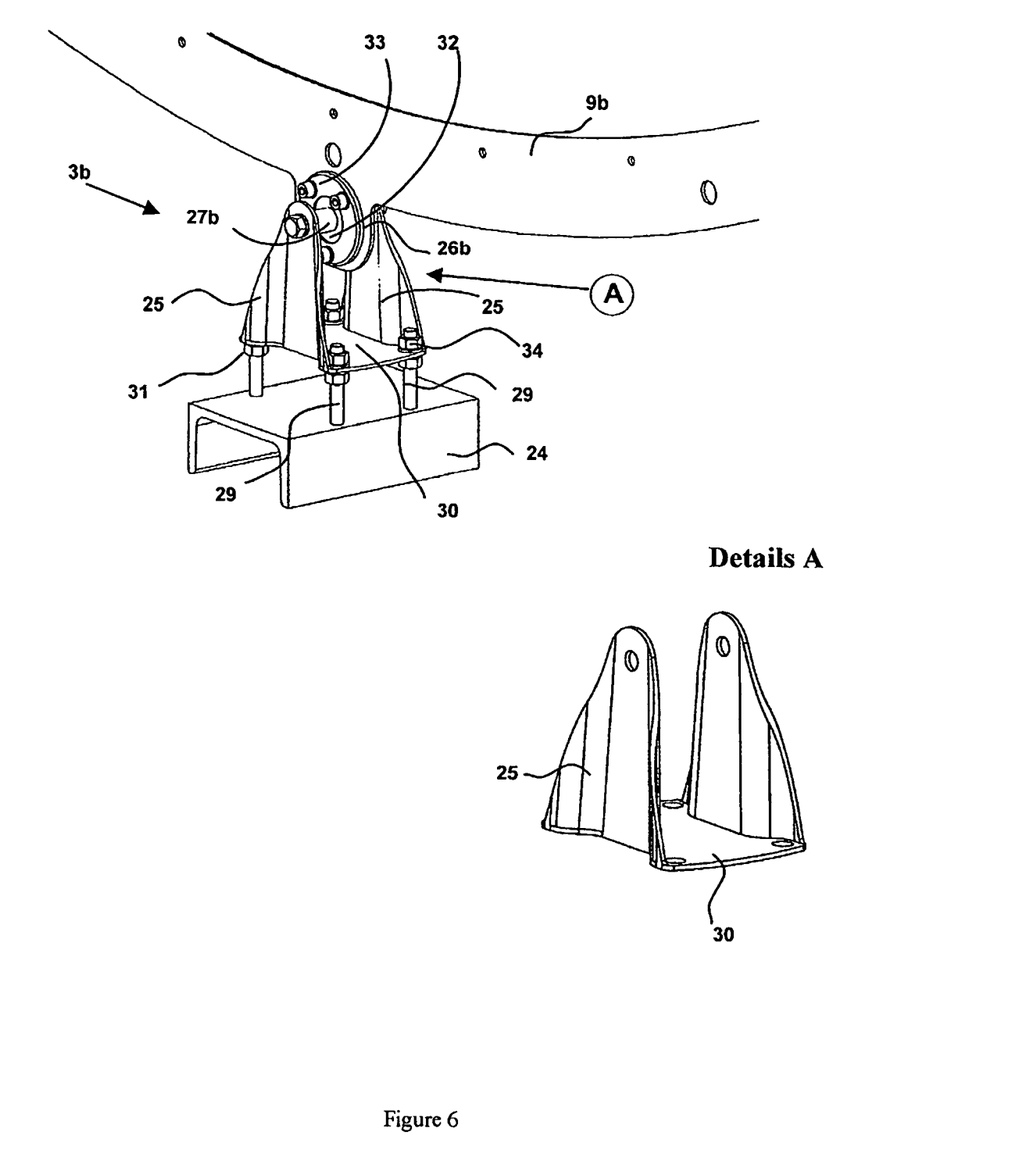

To illustrate the adjustment possibilities of the rotary bearings (3a-d), the detail in FIGS. 6 and 6a show only one rotary bearing (3b) which is adjustable relative to the supporting member (24) of the substructure (2). In contrast to the embodiment shown in FIGS. 1 and 2, the supporting member (24) of the presently contemplated embodiment, only part of which is shown, is constructed in this instance as a U-section and not as a hollow-cylindrical tube. It is crucial for the choice of supporting member only that it has flexural rigidity based on its profile. Four stud bolts (29) facing upward perpendicularly are fastened to the upper side of the U-shaped supporting member (24) so as to receive the rotary bearing (3b) in an adjustable manner. The rotary bearing (3b) comprises parallel cheeks (25) which extend upward perpendicularly and are held at a distance from one another at their lower edge by a plate (30). The plate (30) has, in its corner areas, four elongated holes whose passage cross section is greater than the diameter of the stud bolts (29).

The height of the rotary bearing (3b) can be precisely adjusted by the supporting nuts (31) contacting the underside of the plate (30). The elongated holes allow a limited displacement of the plate (30) in the plate plane and, therefore, together with the height adjustment by the supporting nuts (31), permit the pivot (27b) to be aligned with the rest of the pivots (27a, c) of the adjacent rotary bearings (3a, 3b). The rotary bearing (3b) shown in FIG. 6 is constructed as a floating bearing. Here, the bearing ring (32), which is fixed in the passage of the projection (26b) of the supporting rib (9b), is guided on the pivot (27b) with axial play. In the presently contemplated embodiment, the bearing ring (32) is fixed in the passage of the projection (26) by two clamping rings (33) which contact both sides of the projection (26b) and are screwed together. After correctly orienting the rotary bearings (3a-c) relative to one another, these rotary bearings (3a-c) are secured by the lock nuts (34) which are screwed onto the stud bolts from the top.

Figure 7:
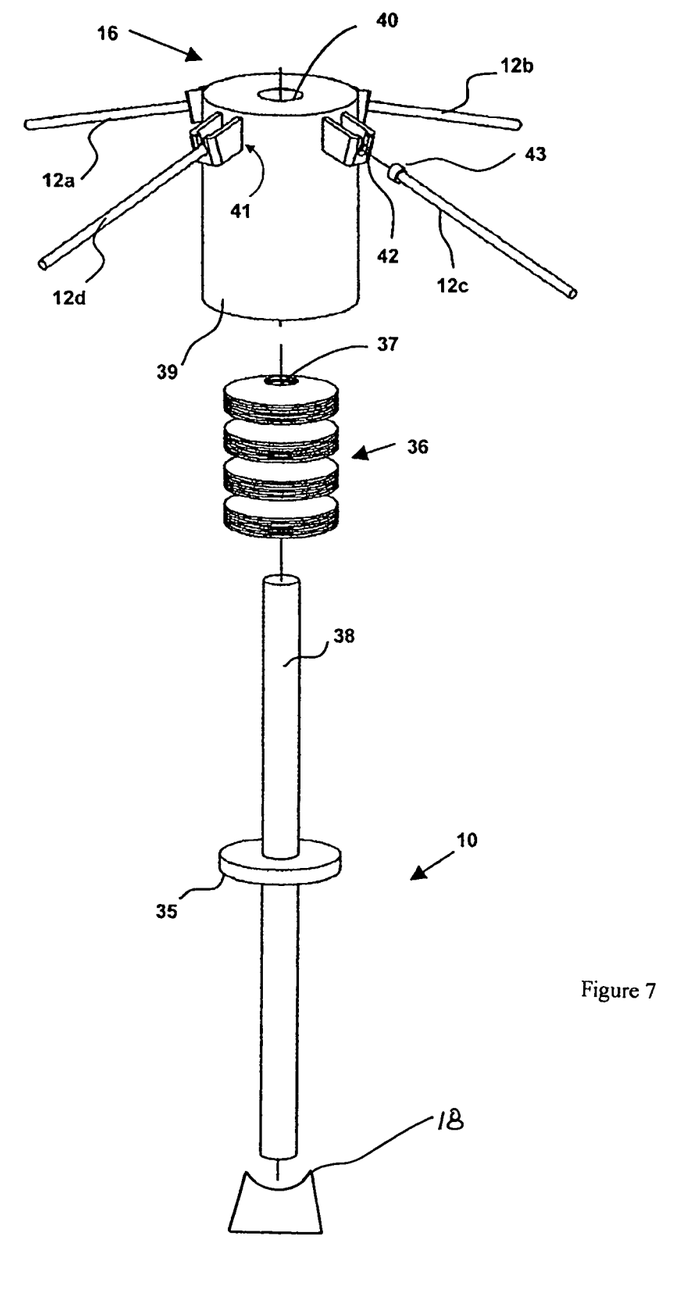
FIG. 7 is a perspective view of a preferred embodiment of a stanchion of the parabolic trough collector according to FIGS. 1 and 2.

A preferred stanchion (10) for the pyramid bracing of the supporting construction (4) will be explained more fully in the following referring to FIG. 7.

The rod-shaped stanchion (10) is received at its lower end by a holder (18), which is arranged at every second supporting rib (9b). A support flange (35) which is not displaceable in the longitudinal direction of the rod-shaped stanchion (10) and which encloses the latter is arranged at a distance to this holder, engaging at the lower end of the stanchion (10). A disk spring stack (36) is supported on the support flange (35), and the passages (37) of the individual disk springs which are stacked one on top of the other to form the disk spring stack (36) correspond at least to the cylindrical cross section of the rod-shaped stanchion (10). Consequently, the disk spring stack (36) can be received by the portion (38) of the stanchion (10) located above the support flange (35).

A hollow-cylindrical sleeve (39) which has a passage (40) at the upper end for the portion (38) of the stanchion (10) is slipped over the disk spring stack (36), while the lower end is completely open. The inner diameter of the hollow-cylindrical sleeve (39) is greater than the outer diameter of the disk spring stack and of the support flange (35) so that the inner surface of the sleeve (39) can slide along the outer edge of the support flange (35).

The sleeve (39) simultaneously forms the stop (16) for the four wire cables or thin rods (12a-d) of the pyramid-shaped bracing of the supporting construction (4) of the parabolic trough collector (1).

In terms of construction, the stop (16) at the sleeve (39) is formed by four holders (41) which are arranged uniformly along the circumference of the sleeve (39) at its upper edge, each holder (41) having at its end facing radially outward a groove (42) which opens upward and which extends in the vertical direction. Thickened ends (43) of the wire cables (12a-d) engage behind the grooves (42) and can therefore be connected to the sleeve (39) without difficulty when assembling.

The individual disk springs of the disk spring stack (36) are preferably layered in the same direction. In this way, the spring force is multiplied without changing the spring travel. This meets the requirement that the forces introduced into the stanchion (10) by the wire cables (12a-d) can be completely absorbed by the disk spring stack (10) without exceeding a maximum permissible displacement path of the stop (16) that would result in a defocusing of the parabolic trough collector. Another decisive advantage of disk spring stacks consists in the friction occurring in disk springs which opposes the externally applied force. The friction forces manifest themselves as hysteresis in the force-displacement characteristic of the disk spring stack. The friction forces are generated by:

(a) friction between the sleeve (39) introducing the force and the individual disk springs of the disk spring stack (36), b) friction between the contacting surfaces of the individual disk springs of the disk spring stack (36) which lie one inside the other in the same direction, and c) friction between portion (38), stanchion (10), and passages (37) of the disk spring stack (36).

At the same time, the friction causes the suspension to be damped against vibrations by the disk spring stack (36). Therefore, this vibration damping which must be achieved in other spring types by a special vibration damper can be integrated in the stanchion (10) in an advantageous and economical manner with respect to construction by using a disk spring stack which is layered at least partially in the same direction.

Of course, it lies within the scope of the invention to connect the stanchion (10), described in detail with reference to FIG. 7, directly to the supporting rib (9b). Further, the invention is not limited to the preferred embodiment form of a rod-shaped stanchion. It is crucial for the construction of the stanchion only that the force transmission devices form the lateral edges of a right pyramid, while the apex lying in the plane of symmetry of the parabolic reflecting surface is formed by the force transmission devices converging at the stanchion. Further, the stanchion is formed symmetrically with respect to the plane of symmetry of the parabolic reflective surface and, in longitudinal direction, with respect to the supporting rib supporting the stanchion so as to ensure that force is uniformly introduced into the supporting rib.

Thus, while there have shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A parabolic trough collector apparatus having a longitudinal direction, comprising:
    a parabolic trough collector having at least one panel with a parabolic cross section and a dimension extending in a straight line in the longitudinal direction, a reflecting surface arranged on the at least one panel and defining a focal line, and an absorber extending along the focal line, wherein the reflecting surface concentrates sunlight on the absorber;
    a supporting construction connected in an articulated manner to a substructure carrying the parabolic trough collector, the supporting construction comprising at least three supporting ribs arranged at a convex underside of the at least one panel and extending transversely to the longitudinal direction of the parabolic trough collector, the supporting ribs comprising alternatingly disposed stanchion-supporting ribs and adjacent ribs, each of the stanchion ribs being disposed between two of the adjacent ribs;
    a stanchion extending upwardly at every stanchion-supporting rib of the at least three supporting ribs, whereby the adjacent ribs are arranged without stanchions extending therefrom;
    a rotary bearing arranged at each supporting rib of the at least three supporting ribs and configured so that the parabolic trough collector is pivotable about a pivot axis which extends parallel to the longitudinal axis;
    a plurality of elongated force transmission devices arranged at the stanchion of each respective stanchion-supporting rib and extending between the stanchion and outer end areas of the two adjacent ribs of the respective stanchion-supporting rib, each of the plural elongated force transmission devices forming a lateral edge of a right pyramid, an apex of the pyramid lying in a plane of symmetry of the parabolic reflecting surface and being formed by the convergence of each of the plural elongated force transmission devices at the stanchion; and
    a cap translatable along the stanchion and connected to each of the plural force transmission devices, wherein the stanchion comprises a spring assembly located below the cap and acting in a direction of the translation of the cap.

2. The parabolic trough collector apparatus according to claim 1, wherein edges of each base of each pyramid, defined by each of the plural elongated force transmission devices, extend in a direction parallel to longitudinal edges and end edges, respectively, of the parabolic trough collector.

3. The parabolic trough collector apparatus according to claim 1, wherein each of the plural elongated force transmission devices comprise one of traction devices and rods.

4. The parabolic trough collector apparatus according to claim 1, further comprising:
    a holder arranged at the convex underside of the parabolic trough collector for each the stanchion arranged at the every second supporting rib;
    wherein each of the plural elongated force transmission devices is arranged at the stanchion at a distance from a fastening of the stanchion to the holder.

5. The parabolic trough collector apparatus according to claim 1, further comprising a vibration damper for the spring assembly.

6. The parabolic trough collector apparatus according to claim 1, wherein the spring assembly comprises at least one disk spring.

7. The parabolic trough collector apparatus according to claim 1, wherein the stanchion is further configured as a holder for the absorber.

8. The parabolic trough collector apparatus according to claim 4, further comprising a plurality of connection members arranged on each of the at least three supporting ribs to provide a desired parabolic shape to the at least one panel.

9. The parabolic trough collector apparatus according to claim 1, wherein the reflecting surface is detachably connected to every panel of the at least one panel of the parabolic trough collector.

10. The parabolic trough collector apparatus according to claim 1, wherein the reflecting surface comprises a component part of a foil arranged on each the at least one panel.

11. The parabolic trough collector apparatus according to claim 4, wherein each of the plural elongated force transmission devices is arranged between two of the at least three supporting ribs in the longitudinal direction of the parabolic trough collector.

12. The parabolic trough collector apparatus according to claim 1, wherein the rotary bearing arranged at each the at least three supporting ribs is adjustably fastened to the substructure.

13. The parabolic trough collector apparatus according to claim 1, wherein the plural elongated force transmission devices comprise at least four elongated force transmission devices.

14. The parabolic trough collector apparatus according to claim 2, wherein each of the plural elongated force transmission devices comprise one of traction devices and rods.

15. The parabolic trough collector apparatus according to claim 1, wherein the pivot axis is a pivot axis of the rotary bearing.

* * * * *